United States Patent
Mekic et al.

(10) Patent No.: US 9,885,795 B2
(45) Date of Patent: Feb. 6, 2018

(54) ACOUSTIC WAVE IMAGING OF FORMATIONS

(71) Applicants: Natasa Mekic, Houston, TX (US); Douglas J. Patterson, Spring, TX (US)

(72) Inventors: Natasa Mekic, Houston, TX (US); Douglas J. Patterson, Spring, TX (US)

(73) Assignee: BAKER HUGHES, A GE COMPANY, LLC, Houston, TX (US)

(*) Notice: Subject to any disclaimer, the term of this patent is extended or adjusted under 35 U.S.C. 154(b) by 434 days.

(21) Appl. No.: 14/519,209

(22) Filed: Oct. 21, 2014

(65) Prior Publication Data
US 2015/0109886 A1 Apr. 23, 2015

Related U.S. Application Data
(60) Provisional application No. 61/893,431, filed on Oct. 21, 2013.

(51) Int. Cl.
*G01V 1/44* (2006.01)
*G01V 1/50* (2006.01)
*G01V 1/28* (2006.01)

(52) U.S. Cl.
CPC .............. *G01V 1/44* (2013.01); *G01V 1/284* (2013.01); *G01V 1/50* (2013.01)

(58) Field of Classification Search
CPC ... G01V 1/44; G01V 1/48; G01V 1/50; E21B 47/00
See application file for complete search history.

(56) References Cited

U.S. PATENT DOCUMENTS

| 4,683,557 A | 7/1987 | Willis |
| 4,832,148 A * | 5/1989 | Becker ................. G01V 1/46 181/104 |

(Continued)

FOREIGN PATENT DOCUMENTS

| WO | 9815850 A1 | 4/1998 |
| WO | 2004067912 A1 | 8/2004 |

OTHER PUBLICATIONS

Notification of Transmittal of the International Search Report and the Written Opinion of the International Searching Authority; PCT/US2014/061556; Korean Intellectual Property Office; dated Jan. 26, 2015; 19 pages.

(Continued)

*Primary Examiner* — Ian J Lobo
(74) *Attorney, Agent, or Firm* — Cantor Colburn LLP (57) ABSTRACT

An embodiment of a method of estimating characteristics of an earth formation includes: disposing an acoustic tool in a borehole in an earth formation, the acoustic tool including an acoustic multipole transmitter and at least one multipole acoustic receiver; transmitting acoustic signals into the borehole, the acoustic signals generating at least one acoustic body wave that radiates away from the borehole into a far-field formation region; measuring reflected signals including body waves reflected from reflective boundaries in the far-field formation region; identifying a reflective boundary in the formation and reflection attributes associated with the reflective boundary; and estimating at least one of a thickness, distance and a lateral extent of a hydrocarbon formation feature based on the reflected signals and the reflection attributes.

20 Claims, 3 Drawing Sheets

(56) References Cited

U.S. PATENT DOCUMENTS

| | | |
|---|---|---|
| 2005/0161258 A1 | 7/2005 | Lockerd, Sr. et al. |
| 2007/0183259 A1 | 8/2007 | Yogeswaren et al. |
| 2009/0205899 A1 | 8/2009 | Geerits et al. |
| 2010/0038135 A1 | 2/2010 | Hummes et al. |
| 2012/0037423 A1* | 2/2012 | Geerits .................. E21B 47/00 175/50 |
| 2015/0013974 A1 | 1/2015 | Mekic et al. |

OTHER PUBLICATIONS

Patterson, et al., "Unconventional Reservoir Fracture Evaluation Utilizing Deep Shear-Wave Imaging", SPWLA 58nd Annual Logging Symposium, May 14-18, 2011, 16 pages.

Bolshakov,E T al; "Fracture Imaging Around the Wellbore Using Dipole Acoustic Logging"; SPE Annual Technical Conference and Exhibitioin; Oct. 30, 2011; 16 pages.

European Search Report for related European Application No. 14856371.1-1559/3060754 PCT/US2014061556; dated May 26, 2017; 11 pages.

Haldorsen, et al.; "Borehole Acoustic Reflection Survey (BARS) Using Full Waveform Sonic Data"; First Break, vol. 28; Jul. 2010; 6 pages.

Tang, et al.; "Single-Well S-Wave Imaging Using MultiComponent Dipole Acoustic-Log Data"; Geophysics. vol. 74, No. 6, Nov. 2009; 14 pages.

\* cited by examiner

ACOUSTIC WAVE IMAGING OF FORMATIONS

CROSS REFERENCE TO RELATED APPLICATIONS

This application claims the benefit of an earlier filing date from U.S. Provisional Application Ser. No. 61/893,431 filed Oct. 21, 2013, the entire disclosure of which is incorporated herein by reference.

BACKGROUND

The effectiveness of hydrocarbon production exploration and production relies on the ability to identify and differentiate regions or formations that include significant amounts of hydrocarbons. For example, in unconventional resources such as shales, the ability to estimate the location and extent of such resources is important in planning and executing operations such as drilling and hydraulic fracturing.

SUMMARY

An embodiment of a method of estimating characteristics of an earth formation includes: disposing an acoustic tool in a borehole in an earth formation, the acoustic tool including an acoustic multipole transmitter and at least one multipole acoustic receiver; transmitting acoustic signals into the borehole, the acoustic signals generating at least one acoustic body wave that radiates away from the borehole into a far-field formation region; measuring reflected signals including body waves reflected from reflective boundaries in the far-field formation region; identifying a reflective boundary in the formation and reflection attributes associated with the reflective boundary; and estimating at least one of a thickness, distance and a lateral extent of a hydrocarbon formation feature based on the reflected signals and the reflection attributes.

An embodiment of a system for estimating characteristics of an earth formation includes an acoustic tool configured to be disposed in a borehole in an earth formation and a processor. The acoustic tool includes an acoustic multipole transmitter and at least one multipole acoustic receiver, the transmitter configured to transmit acoustic signals into the borehole, the acoustic signals generating at least one acoustic body wave that radiates away from the borehole into a far-field formation region. The processor is configured to receive measurement data based on received reflected signals including body waves reflected from reflective boundaries in the far-field formation region, identify a reflective boundary in the formation and reflection attributes associated with the reflective boundary, and estimate a hydrocarbon formation feature based on the reflected signals and the reflection attributes.

BRIEF DESCRIPTION OF THE DRAWINGS

The following descriptions should not be considered limiting in any way. With reference to the accompanying drawings, like elements are numbered alike.

DETAILED DESCRIPTION

There is provided a system and method for estimating earth formation characteristics, such as the extent and characteristics of a hydrocarbon formation. An embodiment of a method includes transmitting compressional and/or shear waves and receiving reflected signals from a near-field and/or far field region. The reflected signals are analyzed to identify characteristics of the formation or a region thereof, including characteristics of reflective boundaries in the formation and various formation properties or attributes.

An embodiment of a method includes transmitting an acoustic signal that generates body waves that radiate away from the borehole. Reflected body waves are analyzed to estimate formation characteristics. The reflected body waves include compressional and/or shear waves. For example, the method includes performing Deep Shear Wave (DSW) imaging through a cased or open hole by measuring deep shear body waves reflected from reflective boundaries to measure characteristics of a formation and/or to evaluate the hydrocarbon content of a formation. Embodiments described herein use reflected body wave imaging to estimate various parameters that are important for successful reservoir characterization, and may be incorporated with processes for completion optimization and production prediction. This analysis maybe used in one or more (or all) phases of a well, e.g., during the open hole phase, after casing has been set, after the initial hydraulic stimulation, after some period of production or after a restimulation phase. This analysis may either stand alone for a particular phase or be combined for two more phases.

In one embodiment, refracted and guided modes along the borehole (in the near-field) are analyzed along with the reflected body waves to provide both near-field and far-field imaging.

Imaging results are analyzed and/or interpreted to estimate formation and/or reservoir characterization parameters, such as bedding planes or facies planes based on identification of reflective boundaries in the formation, which can be used to estimate the extent of a hydrocarbon formation (e.g., thickness and lateral extent). Other exemplary parameters include faults or fractures, which can be identified by following interruptions or steps in reflective horizons, and areas of relatively high hydrocarbon concentrations identified based on analyzing the attributes (e.g., reflection amplitude) of received signals. The received signals may include body waves reflected from reflective boundaries in the formation (e.g., compressional body wave signals and/or DSW imaging signals), and may also include guided and refracted wave modes that are generated along and proximate to the borehole (near field). Estimation of such parameters can lead to more accurate execution of energy industry operations, such as completion and stimulation operations.

In one embodiment, a system and method are provided for transmitting acoustic signals into near- and far-field regions of a formation relative to a borehole, where guided and refracted wave modes are generated along the wellbore (i.e., in the near-field) and body compressional and shear waves are transmitted further out into the formation (i.e., the far-field). The reflected waves are analyzed or imaged to estimate characteristics and features of the formation. This analysis may be applied to compressional waves (i.e., compressional wave imaging) and/or to deep shear waves reflected in the far-field (i.e., deep shear wave imaging (DSWI)). Attributes such as signal amplitude are analyzed to identify and analyze reflective boundaries in the formation, and wave propagation properties may be analyzed for identification of other formation attributes. For example, one or more reflective boundary caused by acoustic impedance contrast (relative to compressional and/or shear waves) are identified and the thickness of the corresponding formation region or feature is estimated.

Figure 1:
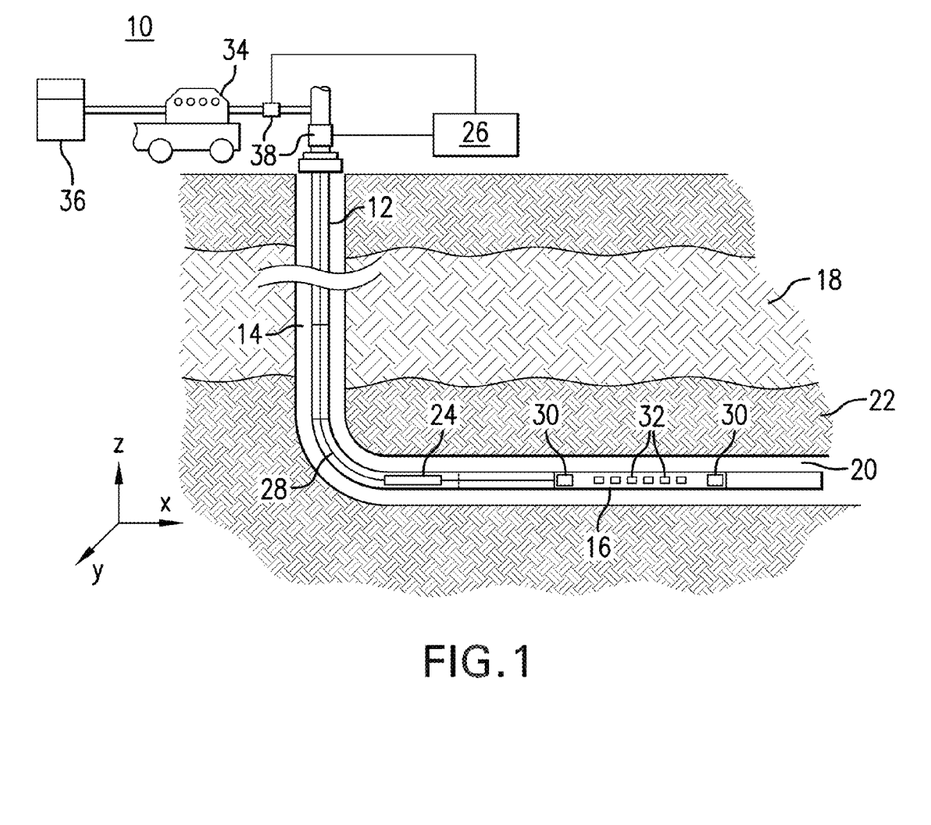
FIG. 1 depicts an embodiment of a system for evaluating or measuring a formation.

FIG. 1 illustrates aspects of an exemplary embodiment of a system 10 for performing energy industry operations such as formation measurement and/or evaluation, hydrocarbon production, completion and stimulation. The system 10 includes a borehole string 12 such as a pipe string, coiled tubing, wireline or other carrier disposed within a borehole 14 that is suitable for lowering a tool or other component through a borehole or connecting a component to the surface. The term "carrier" as used herein means any device, device component, combination of devices, media and/or member that may be used to convey, house, support or otherwise facilitate the use of another device, device component, combination of devices, media and/or member. Exemplary non-limiting carriers include casing pipes, wirelines, wireline sondes, slickline sondes, drop shots, downhole subs, BHA's, frac ports and drill strings.

In one embodiment, the system 10 includes a measurement and/or monitoring system. A data acquisition tool 16 is disposed in the borehole 14 and advanced to an area or location of interest within a formation 18. For example, the borehole 14 includes a lateral borehole section 20 that is drilled below or through an area of interest, such as a hydrocarbon resource 22 (e.g., a shale layer or region) or a region in which a hydrocarbon resource is thought to exist. The data acquisition tool 16 is configured to emit measurement signals into the hydrocarbon resource 22 (or other area of interest 22) to estimate characteristics thereof. It is noted that although the embodiments described herein are described in conjunction with lateral wells, they are not so limited, as they could be used with vertical, deviated, horizontal and any other boreholes having any selected path through a formation.

The data acquisition tool 16 is configured to monitor and/or collect data related to formation characteristics. The tool 16 may be deployed downhole via any suitable carrier and may be configured to operate in conjunction with other downhole or surface tools. In one embodiment, the tool 16 and/or other downhole components are in communication with one or more processing units or devices, such as a downhole electronics unit 24 and/or a surface processing unit 26. The processing devices are configured to perform various functions including receiving, storing, transmitting and/or processing data from the tool 16. The processing devices include any number of suitable components, such as processors, memory, communication devices and power sources. Communication can be achieved via any suitable configuration, such as electrical or optical communication (e.g., via a communication cable 28), wireless communication and mud pulse telemetry.

In one embodiment, the tool 16 and/or the system 10 is configured for acoustic monitoring of the formation 18 and/or area of interest that may be a hydrocarbon resource 22. The tool 16 includes acoustic monopole and/or multipole transmitters 30 (e.g., dipole transmitters) that emit acoustic energy pulses (also referred to as "measurement signals") that typically travel radially outwardly from the transmitters 30. Multiple oriented transmitters may be disposed at the location shown at 30. One or more acoustic receivers 32, such as an axial array of multipole receivers 32, are positioned along the tool 16. The transmitters 30 in this embodiment are configured to emit measurement signals in a direction generally orthogonal from the axis of the tool 16 and the borehole section 20 (e.g., in the z- and/or y-directions shown in FIG. 1). The cross dipole transmitters can be configured to orient signals in any selected direction based on the location of the area of interest.

The system 10 may include various other components for facilitating a measurement operation, and/or for facilitating other energy operations. For example, the system 10 includes a pumping device 34 in fluid communication with a fluid tank 36 or other fluid source for circulating fluid through the borehole 14. The surface processing unit 26 may be configured to monitor and/or control operation of the pumping device using sensors such as one or more flow rate and/or pressure sensors 38 positioned one or more locations, such as proximate to or within the pumping device 34, at or near the wellhead, and/or downhole. This circulation may be performed during measurement and may be performed during additional operations performed prior to, during or after the measurement operation. For example, the system 10 can be used to perform drilling operations, stimulation operations (e.g., hydraulic fracturing and steam lift), completion operations and production operations.

The tool 16 may be configured to evaluate the formation using one or more of various techniques. Such techniques include monopole techniques such as Borehole Acoustic Reflection Surveys (BARS). Other techniques include dipole techniques such as cross-dipole imaging and Deep Shear Wave Imaging (DSWI).

BARS imaging techniques utilize a monopole source with azimuthal receivers to provide directional sensitivity. The monopole source in a borehole produces multiple modes (compressional, shear, and Stoneley). All of these modes are suppressed in order to look at reflected wave events. Monopole tools are typically limited to high frequency of around 10 kHz due to the tool azimuthal receiver geometry required for directional sensitivity, which can result in a severe limitation due to formation attenuation limiting the range. The BARS imaging technique uses P or S waves generated by a monopole transmitter which produce a relatively complex reflected wavefield (P to P and P-S reflected along with the P-P and P-S refracted).

For dipole configurations, an exemplary tool 16 uses one or more dipole sources that transmit energy into the borehole and the formation. For example, the dipole source transmits in a z-direction and/or y-direction extending away from the borehole section 20. Typically these dipoles are orthogonal to each other, in a configuration referred to as a cross dipole configuration, in which all 4 components are recorded (XX, YY, XY and YX). Since the dipole orientation in some instances may not align with the desired reference orientation, additional information regarding the tool orientation can also be obtained to allow resulting data to be mathematically rotated and create a virtual source aligned in any orientation. Flexural waves are generated that typically can reflect and provide readings out to around 2-4 feet into the formation. Waves that are radiated away from the borehole and travel farther into the formation are referred to as body waves, which can be reflected back to the borehole and are detected as signals that are late-arriving and faint relative to the reflected flexural wave signals.

For example, the dipole source or transmitter 30 generates two different types of shear body waves and a compressional wave into the formation. A first shear wave and the compressional wave is aligned with the dipole source and polarized in the "z" direction, and a second oriented shear wave is polarized in the "y" direction. Energy reflected back from these waves can provide information for features and characteristics of the area of interest, such as boundaries between beddings or facies (which can be used to estimate the thickness of a hydrocarbon formation), sub-seismic faults, areas of high hydrocarbon concentration and geological characteristics. In one embodiment, additional information such as borehole trajectory is utilized in analyzing the reflected waves to address uncertainty as to the location of a reflector and determine whether the reflector is located above or below the borehole.

Cross-dipole acoustic imaging can be used to detect vertical and lateral extent as well as azimuth of the formation shear wave anisotropy in the near-field (e.g., about 2-4 feet). The estimated amount of anisotropy gives a measure of intensity and the associated azimuth gives direction.

DSWI uses data generated from the cross-dipole sources. A DSWI processing technique uses shear body waves that radiate into the formation and are reflected by reflective boundaries in the formation. "Reflective boundaries" refer to any feature or characteristic that causes the shear body waves to reflect back toward the receivers. Exemplary reflective boundaries include bedding planes or facies boundaries, sub-seismic faults, areas having different amounts of hydrocarbons, natural and/or stimulated fractures and other reflective features with acoustic impedance contrast.

DWSI signals can be propagated a significant distance from the transmitters, referred to as a far-field. The far-field is typically tens of feet away from the borehole and may extend 60 feet and more (e.g., about 80-90 feet or more). The effective imaging range is a function of the signal to noise present in the data, the length of the recording time and the angle of incidence between the borehole and the reflector. The anisotropy and azimuth can be used to estimate the location, intensity and strike (azimuth) of reflective boundaries. This information can be used to estimate characteristics of the formation.

The DSWI processing technique has only one direct wave mode that must be suppressed. In addition, the dipole source used for DSWI operates at a much lower frequency of 2-3 kHz, which allows a much deeper depth of investigation. In addition, improved results can be achieved by only looking at reflected shear waves, which have a greater sensitivity to fractures. Thus, DSWI allows for effective imaging at greater distances than is possible with cross-dipole and other imaging techniques.

In one embodiment, various conditions are considered when performing DSWI measurements. For example, incompressible fluid or flow is in the borehole when DSWI is performed, and if the borehole region from which measurements are taken is cased, a good casing-cement bond should be present, as a poor casing-cement bond may produce casing flexural wave which may complicate and contaminate formation "refracted or guided modes" and also possibly the reflected body shear wave signal. The dipole tool should be centered in the borehole, as a decentered dipole tool in cased holes may produce additional unwanted modes complicating the analysis.

In addition to the deep shear waves, attributes of compressional body waves reflected from the formation may also be analyzed. The imaging can be defined by using compressional waves alone or in combination with a DSWI approach. Frequency ranges of compressional and shear waves differ along with wave propagation properties, which would extend the range of resolution of formation reflection features as well as formation attributes. Furthermore, the DSWI and/or compressional wave imaging in the far-field can be used in conjunction with near-field imaging or analysis of refracted or guided waves along the borehole.

As indicated above, DSWI and/or compressional wave imaging can be employed to estimate various formation parameters for, e.g., reservoir characterization. In one embodiment, the parameters are related to unconventional resource plays such as shales and tar sands. Unconventional resources are typically defined as hydrocarbons (e.g., natural gas, gas condensates, and crude oil) that are produced by means that do not meet the criteria for conventional production. Such resources may be characterized by porosity, permeability, fluid trapping mechanism, or other characteristics that differ from conventional sandstone and carbonate reservoirs. For example, hydrocarbon reservoirs that have low permeability and porosity, and are thus difficult to produce, can be considered unconventional resources. Enhanced recovery techniques, such as fracture stimulation and steam injection, are often performed to facilitate production. Examples of unconventional resources include coalbed methane (CBM), gas hydrates, shale gas, shale oil, fractured reservoirs, tight gas sands and heavy oil/tar sands. Although embodiments of parameters that can be evaluated are described in relation to DSWI, such parameters may also be evaluated using compressional wave imaging, DSWI or a combination.

Exemplary parameters that can be evaluated using DSWI include the location and extent of bedding planes and/or facies planes, e.g., boundaries between formation tops or facies in a formation. This information can be used to estimate the thickness of formations and/or different facies and identify variations in facies. For example, the thickness of the formation 18 from the horizontal borehole section 20 is estimated based on identifying a boundary between the formations 18 and/or facies.

Identifying facies reflective boundaries will help first describe their accurate lateral extent along the lateral well as well as their thickness. It is well known that different facies characteristics carry different reservoir parameters that influence production. For example, reservoir permeability and porosity can greatly vary with facies. Identifying thickness and shape of the facies along a lateral well can be used to influence decisions how to complete the well the most successfully.

In addition, faults or fractures extending away from the borehole or borehole section can be identified using DSWI data. For example, DSWI data from a horizontal borehole section can be used to identify features such as sub-seismic faults and vertical features by following interruptions or steps in reflective horizons. "Sub-seismic" faults typically refer to features that cannot be resolved using surface seismic measurement systems. Such surface systems generally operate on the order of 50 Hz (100-200 foot wavelengths), and thus cannot resolve features that are less than one quarter of the wavelength. DSWI imaging from a borehole can be used to identify such features which the much higher frequency range, typically 2000-3000 Hz.

Identifying faults or fractures extending away from the borehole section can provide information such as if and where the borehole crosses a fault or fracture. This information is useful, e.g., for configuring hydraulic fracturing operations to apply fracturing at desired regions around the borehole and/or avoid applying fracturing fluid at fault locations.

Other characteristics that can be estimated using compressional wave and/or DSW imaging include "hot spots" or areas having a higher concentration of kerogen or hydrocarbons. Higher reflection amplitudes of return signals may indicate the presence of such a hot spot. For example, areas of relatively high contrast amplitude are associated with high shear and/or compressional acoustic impedance, which is associated with areas of high concentrations of kerogen and/or hydrocarbons.

Estimation of these parameters can lead to more effective evaluation of formations and more accurate completion and stimulation operations. For example, completion can be improved or optimized by more effectively placing stages and perforation clusters for influencing and increasing better production. The DSWI imaging can be used to estimate parameters used for reservoir characterization in unconventional resource plays that will influence decisions for future planning of completing or fracturing a reservoir for its full potential.

The DWSI imaging and evaluations described herein can also be used for conventional resource plays. The DWSI imaging provides for fine resolution of detail at far-field distances that can be input to models of the shape and thickness of a reservoir or target zone. Information about the shape and/or size of a reservoir, or thickness along a lateral borehole, can be obtained with finer resolution than other seismic measurement techniques. Thickness of the reservoir along the lateral well can be used in very accurate geological and reservoir interpretation and calculation of volumetric parameters, which can be used for, e.g., gross pay calculation and more accurate production predication.

Figure 2:
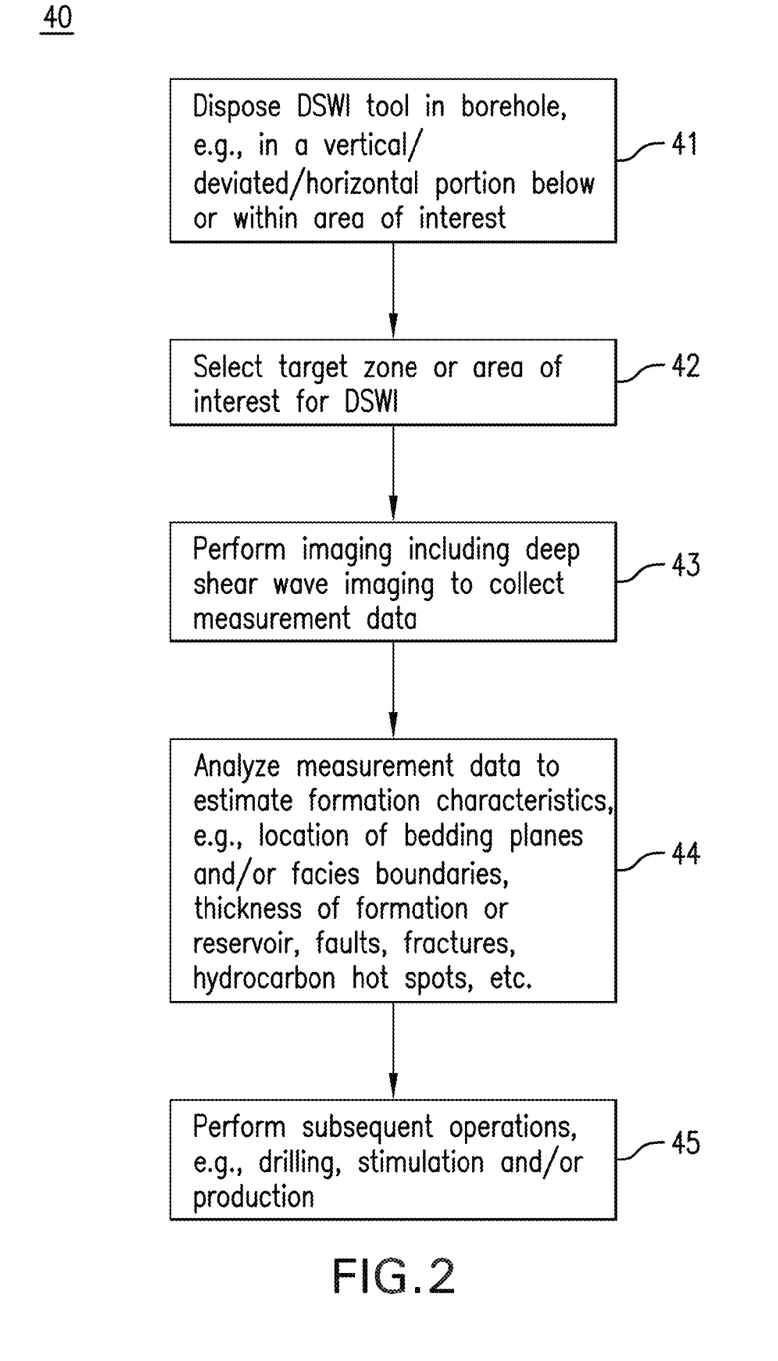
FIG. 2 is a flow chart illustrating an embodiment of a method of estimating characteristics of a formation.

FIG. 3 illustrates a method 40 for estimating characteristics of a formation. The method 40 includes one or more stages 41-45. The method 40 is described herein in conjunction with a processor (e.g., the processing unit 26) that receives signal data, but is not so limited, and can be performed in conjunction with any number of processing devices. In one embodiment, the stages 41-45 are performed in the order described, although some steps may be performed in a different order or one or more steps may be omitted.

In the first stage 41, an imaging tool or DSWI tool such as the tool 16 is disposed in a borehole in an earth formation. In one embodiment, the borehole is a lateral borehole or well. For example, the borehole has a horizontal or deviated portion such as the borehole section 20. The horizontal portion is disposed below or within a formation of interest, such as a shale formation or shale reservoir.

In the second stage 42, a target zone or area of interest is selected for evaluation. The target zone may be selected based on pre-existing information indicating a potential reservoir. For example, a horizontal or deviated borehole is drilled in an area within or below a projected reservoir or formation thought to include hydrocarbon resources. An exemplary area of interest is an unconventional resource area such as a shale or heavy oil region.

In the third stage 43, the area surrounding the tool is imaged. Imaging may be performed through a cased hole or an open hole, and may be performed prior to and/or after an energy industry operation. For example, the imaging can be performed pre-frac and/or post-frac (e.g., post-frac in time sequences). DSWI imaging is performed by running an appropriate logging tool, such as the tool 16, through a borehole (e.g., the lateral borehole section 20) and receiving reflected signals from reflective boundaries on the formation. DSW imaging, in one embodiment, is performed in the far-field in conjunction with another imaging technique. For example, DSWI is used for the far-field, and cross-dipole acoustic measurements are performed in the near-field.

Figure 3:
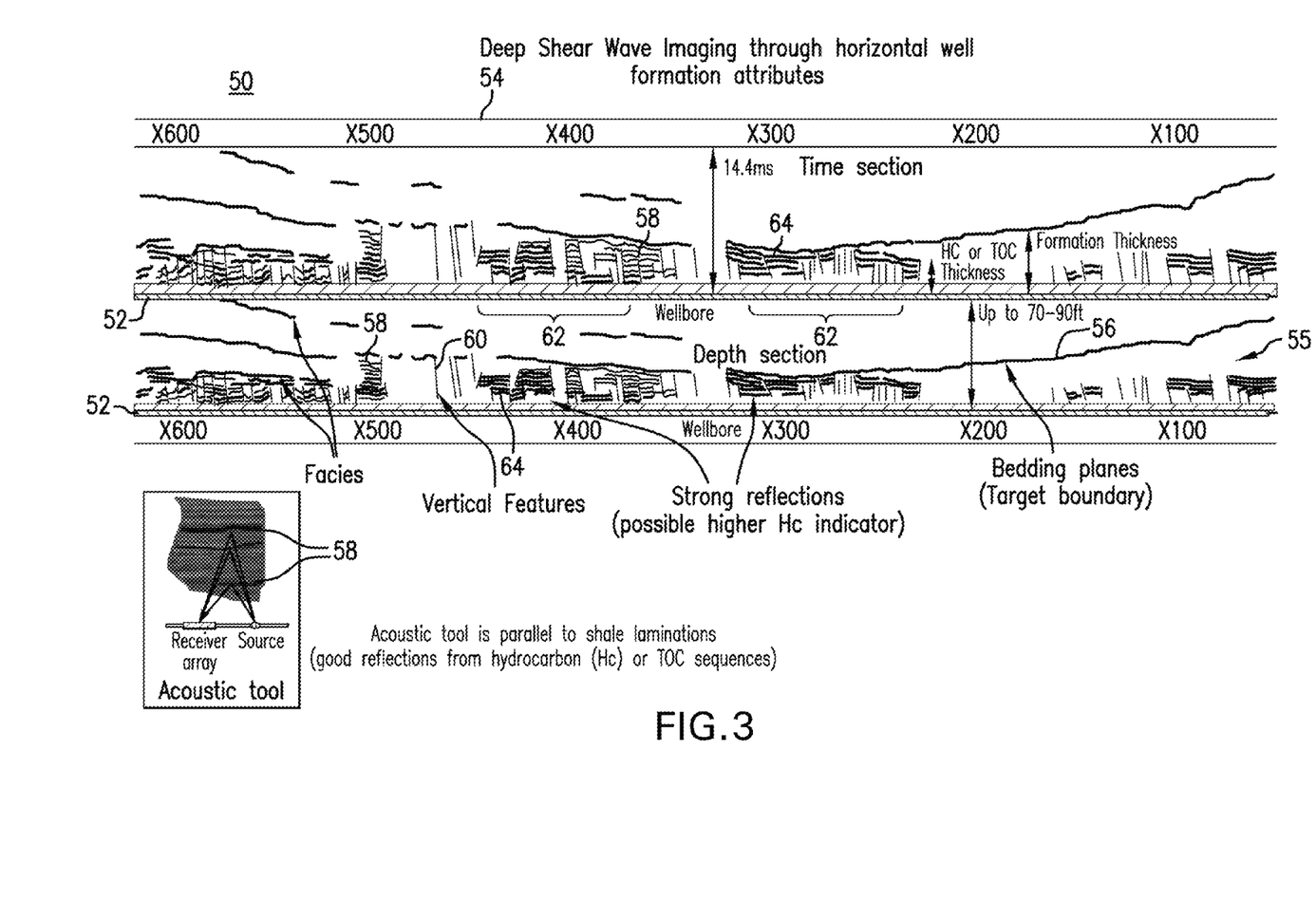
FIG. 3 depicts exemplary measurement results of the method of FIG. 2.

Exemplary DSWI measurement data is shown in FIG. 3. A portion of a DWSI image log 50 shows reflection amplitude along a section of a borehole 52 that extends horizontally (in the x-direction). The measurements in this example are oriented in the z-direction, thus showing DSWI images taken from above and below the borehole 52. The log 50 shows measurements taken over time, which correspond to positions along the x-axis.

In the fourth stage 44, the DWSI data ("measurement data") is analyzed to estimate characteristics of the formation. Based on the refection amplitude of reflected signals, various characteristics of the formation are estimated. For example, reflective boundaries are identified and correlated with features of the formation such as boundaries between facies and boundaries associated with different layers or strata. Other features such as sub-seismic faults, faults or fractures intersecting the borehole or in the far-field away from the wellbore with an apparent dip angle relative to the borehole, and geological characteristics may be identified.

Reflected signals received during DSWI occur due to reflection of waves from boundaries having an acoustic impedance contrast. Such boundaries can be formed, for example, by laminae in an unconventional shale play, changes in geological characteristics or changes in concentration or type of hydrocarbons. In addition, impedance is a function of the density difference between two environments, and thus reflections can be a result of a boundary between a hard rock material and a soft material (e.g., kerogen) or fluid/gas. Thus, strong reflections can be analyzed to estimate features such as facies type and the presence and type of hydrocarbons.

For example, the image log 50 shows images 54 and 55 of reflected signals above the borehole 52 (additional images can be provided of other regions around the borehole 52). Image 54 shows reflections corresponding to their time of receipt, and image 56 shows the reflections at distances from the borehole corresponding to the time of receipt. Lines of darker areas in the images 54 and 55, also referred to as horizons, show signals having higher reflection amplitude and are indicative of different features.

A relatively continuous horizon extending along the length of the borehole (highlighted by line 56) is identified as corresponding to bedding planes indicating a facies boundary between a shale formation and a different facies type above the shale formation. The distance from the borehole to the boundary 56 is measured to estimate the thickness of the shale formation. The total lateral extent of the boundary 56 may also be measured to estimate the lateral extent of the boundary.

In this example, the formation identified by boundary 56 is a shale formation. The type of formation may be ascertained by pre-existing data or knowledge, other measurement date, and/or by analysis of the DSWI data. For example, as shown in the image 54, the region below the boundary 56 shows multiple reflective boundaries 58, which can be indicative of a highly laminated formation such as shale. The extent of these laminae can be used to estimate the thickness and extent of the shale formation, as well as the thickness of bedding layers. For example, the darker boundaries 58 can indicate reflection due to boundaries with contrast due to oil within a shale layer vs. a carbonate-rich shale layer or a siliceous shale layer (e.g., siliceous layers may correspond with lighter regions between boundaries 58).

Other features that can be identified or estimated include vertical and sub-vertical faults or fractures 60 extending from the borehole. These faults or fractures 60 can be identified by discontinuities or steps along the darker boundaries 58. By following the discontinuities or steps, the paths of such faults or fractures 60 are identified. One advantage of the embodiments described herein is that at least some of the faults/fractures 60 may be sub-seismic faults, i.e., faults that cannot be identified by surface or other seismic measurement techniques.

In one embodiment, the images are analyzed the estimate the relative concentration of hydrocarbons within a formation. For example, lines or horizons that are darker, corresponding to greater reflection amplitudes, can be correlated with regions of higher hydrocarbon concentrations. Exemplary areas of higher concentration or hot spots 62 include darker lines or horizons 64 indicative of higher concentrations. By contrast, areas in which the horizons are relatively faint are considered to have a lower concentration.

Formation identification and hydrocarbon concentration information is useful in a variety of applications, including drilling and stimulation operations. For example, knowledge of the thickness and lateral extent of a shale or other formation provides guidance when planning the path for drilling. In addition, stimulation planning can be enhanced, e.g., by placing perforation and fracturing locations in areas of higher concentration such as areas 62. In addition, knowledge of the locations of discontinuities indicating potential faults 60 aids in improving stimulation by avoiding fault locations when planning hydraulic fracturing locations along the borehole.

In the fifth stage 45, the DSWI evaluation results are used to facilitate other operations, such as modeling and planning, drilling, stimulation and production.

For example, the DSWI evaluation results (e.g., shale thickness and lateral extent, lithology) are used to generate or develop mathematical models such as geological models, facies models, structural models, fracturing models, production models, and drilling navigation models. They can also be used in conjunction with other measurement results such as surface and vertical borehole seismic results, active and microseismic interpretation results and reservoir characterization results using other measurement techniques (e.g., resistivity, porosity, gamma ray, density, neutron and other measurements). In addition, DSWI results can be used to improve interpretation results for technologies such as surface seismic and microseismic measurement techniques.

Other operations that can be improved using the DSWI evaluation results include drilling operations, which can be directed based on the extent and location of identified shale regions and areas of high hydrocarbon concentration. Fracturing operations can be controlled, e.g., to avoid fractures or faults intersecting a borehole and to target areas of high hydrocarbon concentration. The DSWI evaluation techniques can be performed before and/or after a stimulation, fracturing or other operation (i.e., pre- and/or post-stimulation). For example, DSWI measurements are taken both before and after an operation to evaluation the success or effectiveness of the operation.

Although embodiments described herein involve evaluation of an area around a borehole using measurements performed within the same borehole, they are not so limited. The DSWI evaluation can be performed (e.g., for formation evaluation, operation or well planning, and/or evaluation of stimulation operations) for an area around the borehole in which the measurements are taken, or the measurements performed within a borehole can be used to evaluate a region or regions around one or more other boreholes. For example, DSWI measurements can be taken in one or more offset wells to evaluate the region around another well or a region around one or more proposed wells. This provides valuable information that can be effectively used in planning current and future borehole or well designs.

Generally, some of the teachings herein are reduced to an algorithm that is stored on machine-readable media. The algorithm is implemented by a computer or processor such as the processing unit 26 and/or electronics unit 24 and provides operators with desired output.

In support of the teachings herein, various analysis components may be used, including digital and/or analog systems. The devices, systems and methods described herein may be implemented in software, firmware, hardware or any combination thereof. The devices may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the devices and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure. The computer executable instructions may be included as part of a computer system or provided separately.

One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of estimating characteristics of an earth formation, comprising:
   disposing an acoustic tool in a borehole in an earth formation, the acoustic tool including an acoustic multipole transmitter and at least one multipole acoustic receiver;
   transmitting acoustic signals into the borehole, the acoustic signals generating at least one acoustic body wave that radiates away from the borehole into a far-field formation region;
   measuring reflected signals including body waves reflected from reflective boundaries in the far-field formation region;

identifying a reflective boundary in the formation and reflection attributes associated with the reflective boundary; and estimating at least one of a thickness and a lateral extent of a hydrocarbon formation layer based on the reflected signals and the reflection attributes, and estimating a concentration of a hydrocarbon in the hydrocarbon formation layer based on the reflection attributes.

2. The method of claim 1, wherein the reflected signals include deep shear wave signals and compressional body wave signals, and the estimating is based on a combination of the deep shear wave signals and the compressional body wave signals.

3. The method of claim 1, wherein the acoustic signals also create refracted and guided wave modes in a near-field region along the borehole.

4. The method of claim 1, wherein the reflected signals include deep shear wave (DSW) signals.

5. The method of claim 1, wherein the reflective boundary is caused by an acoustic impedance contrast in the formation.

6. The method of claim 1, wherein the transmitted and reflected body waves are at least one of compressional and shear waves.

7. The method of claim 6, wherein estimating includes identifying formation boundaries by measuring wave propagation properties of at least one of the compressional waves and the shear waves.

8. The method of claim 1, wherein the formation feature includes at least one of a geological structure, a formation top, a facies feature, a natural fracture, a hydraulically induced fracture, and a formation attribute which causes an acoustic impedance of the body waves.

9. The method of claim 1, further comprising planning a stimulation operation, wherein the planning includes selecting one or more regions around the borehole for stimulation based on estimating the at least one of the thickness, distance and a lateral extent of the hydrocarbon formation feature.

10. The method of claim 1, wherein the borehole is a first borehole in which the acoustic tool is disposed, and the far-field formation region is a region around at least one of a second existing borehole and a planned borehole.

11. A system for estimating characteristics of an earth formation, comprising:

an acoustic tool configured to be disposed in a borehole in an earth formation, the acoustic tool including an acoustic multipole transmitter and at least one multipole acoustic receiver, the transmitter configured to transmit acoustic signals into the borehole, the acoustic signals generating at least one acoustic body wave that radiates away from the borehole into a far-field formation region; and a processor configured to receive measurement data based on received reflected signals including body waves reflected from reflective boundaries in the far-field formation region, identify a reflective boundary in the formation and reflection attributes associated with the reflective boundary, estimate at least one of a thickness and a lateral extent of a hydrocarbon formation layer based on the reflected signals and the reflection attributes, and estimate a concentration of a hydrocarbon in the hydrocarbon formation layer based on the reflection attributes.

12. The system of claim 11, wherein the reflected signals include deep shear wave signals and compressional body wave signals, and the processor is configured to estimate the at least one of the thickness and the lateral extent based on a combination of the deep shear wave signals and the compressional body wave signals.

13. The system of claim 11, wherein the acoustic signals also create refracted and guided wave modes in a near-field region along the borehole.

14. The system of claim 11, wherein the reflected signals include deep shear wave (DSW) signals.

15. The system of claim 11, wherein the reflective boundary is caused by an acoustic impedance contrast in the formation.

16. The system of claim 11, wherein the transmitted and reflected body waves are at least one of compressional and shear waves.

17. The system of claim 16, wherein the processor is configured to identify formation boundaries by measuring wave propagation properties of at least one of the compressional waves and the shear waves.

18. The system of claim 11, wherein the formation feature includes at least one of a geological structure, a formation top, a facies feature, a natural fracture, a hydraulically induced fracture, and a formation attribute which causes an acoustic impedance of the body waves.

19. The system of claim 11, wherein the processor is configured to at least partially plan a stimulation operation by selecting one or more regions around the borehole for stimulation based on estimating the at least one of the thickness, distance and a lateral extent of the hydrocarbon formation feature.

20. The system of claim 11, wherein the borehole is a first borehole in which the acoustic tool is disposed, and the far-field formation region is a region around at least one of a second existing borehole and a planned borehole.

* * * * *